Nov. 24, 1964    W. BINDER ETAL    3,158,242
MINIATURE CLUTCH
Filed March 23, 1960

INVENTORS
WILHELM BINDER
RUDOLF HAUER
BY Nolte and Nolte
ATTORNEYS

United States Patent Office 3,158,242
Patented Nov. 24, 1964

3,158,242
MINIATURE CLUTCH
Wilhelm Binder and Rudolf Hauer, Villingen, Black Forest, Germany, assignors to Binder Magnete K.G., Villingen, Black Forest, Germany
Filed Mar. 23, 1960, Ser. No. 17,109
Claims priority, application Germany Mar. 24, 1959
5 Claims. (Cl. 192—84)

The invention relates to electromagnetically actuated clutches and brakes and concerns a miniature clutch having no slip ring. Such miniature clutches, which may be employed to transmit torques of, for example, 0.1 to 10 kg.-cm., may be used above all in computers, counters or like apparatus in which the torques required generally do not exceed the higher value mentioned above and in which short operating times are required in addition to minimum overall dimensions. Since such miniature clutches are mass-produced articles, a further requirement exists to construct such clutches or brakes both simply and cheaply.

The invention has for its object to provide an electromagnetically actuated miniature clutch having no slip ring, which is simple and cheap to produce and which, while being of simple construction, ensures high rapidity of operation and reliability over lengthy periods.

Electromagnetically actuated clutches having no slip ring are known per se. In one known clutch, the coil is disposed in a magnetic housing of U-shaped cross-section, which is open towards the inside and which surrounds the laminations and is held fast from the outside. The abutment for the bundle of laminations, which is fast with one shaft, forms one pole piece, while the armature, which is fast with the pressure plate of the laminations, forms the other pole piece of the magnetic system. This known arrangement is unsuitable for miniature clutches, because it has a large radial space requirement and in addition its construction is too complicated for mass production. Another known electromagnetically actuated clutch having a magnetic housing rigidly supported from the outside comprises a winding subdivided into two ring coils, which are disposed at intervals along the axis of a pot-shaped magnetic housing and the end wall of which at the same time supports the bearings for the shafts to be coupled together. Disposed between the two ring coils are the clutch plates, which are rotatably mounted directly on the shaft ends and one of which is axially movable in relation to the associated shaft. This known clutch also serves to transmit relatively high torques. In a modification of this known clutch, it has even been proposed to widen radially the central portion of the pot-shaped housing in order that plates may be employed, the diameter of which is substantially larger than the diameter of the toroidal coils. This clutch is also unsuitable for use as a miniature clutch.

The invention is concerned with an electromagnetically actuated miniature clutch in which, as in the known clutches, the magnetic housing is fixed and supports a ring coil. The characteristic feature is that the coil is enclosed by two annular housing shells formed symmetrically with respect to a radial plane, which shells combine to form the magnetic housing and have a central cylindrical guide. Extending into the said cylindrical guide with minimum clearance are cylindrical members composed of magnetizable material, at least one of which serves as an armature for the magnetic system. The cylindrical parts are, in known manner, connected, for the transmission of torque, with the component elements to be coupled together and can cooperate by means of their end faces to transmit the torque. At least the part serving as an armature is arranged to be axially displaceable relative to the shaft connected thereto. The miniature clutch designed in accordance with the invention consists only of a few parts, which can be simply produced. Thus, the two housing shells, each of which surrounds one coil, may be of like construction, so that the same operation and the same tool can be employed to produce both of them.

Since the magnetic flux for generating the torques is of the relatively low value of 0.1 to 10 kg.-cm., the shells can be produced from a material such that they can be pressed, deep-drawn or similarly formed.

For the assembly of the two housing shells forming the magnetic housing, a central thin-walled sleeve, bush or hollow rivet consisting of non-magnetic material may be provided, which is fitted into the interior of the magnetic housing and is so flanged over at its end edges that the two housing shells are held together by the sleeve.

If only one coil is provided, the two cooperating cylindrical parts may also be of identical form. They may, for example, consist of a hollow cylindrical part or sleeve made of magnetizable material which may have a core of non-magnetic material for the torque-transmitting connection to the associated shaft. The said core may consist, for example, of brass or like non-magnetic metal or of a plastic material. In the latter case, only the annular end faces, which preferably extend somewhat beyond the core, co-operate to transmit the torque on actuation of the clutch. In order to prevent rapid wear on the said annular end faces, it may be advantageous for these end faces to be hardened.

In some cases, it may also be necessary to provide the miniature clutch with two ring coils which are axially juxtaposed and are selectively energized independently of one another in order to reverse the direction of rotation of the shaft to be driven or to brake the shaft after disengagement of the clutch in order to bring it to the position of rest as rapidly as possible. In the case of a miniature clutch according to the invention designed in this form, and having at least two coils, each coil is also surrounded by two housing shells and all four housing shells of the clutch can be held together by a central hollow cylindrical rivet or sleeve. Thus, four or more housing shells of like construction serve as the magnetic housing. The armature may consist of a hollow cylindrical part which is so mounted on the shaft to be driven as to be axially displaceable thereon, but which is so connected thereto as to transmit torque.

The clutch or brake according to the invention is advantageously disposed in a housing with which it forms a unit ready for fitting. Such an arrangement has the advantage that the housing surrounding the magnetic circuit may serve at the same time as a support for bearings for the parts to be coupled together. It has proved advantageous, for a reliable operation of the clutch according to the invention, for the armature to be accurately centrally guided in the sleeve holding the housing shells together, in such manner that a very small radical clearance exists between the sleeve and the armature. This clearance is convenient, because the parts to be coupled with the miniature clutch according to the invention generally rotate at a very high speed.

The clutch according to the invention cannot only be produced in a very simple and reliably operating manner, but it also has very short operating times of down to about 10 milliseconds, despite its very simple construction and the low outlay for technical means.

A number of embodiments of the invention are hereinafter more fully explained with reference to the accompanying diagrammatic drawings, in which:

FIG. 1a is a fragmentary view of a portion of FIG. 1 looking in the direction of the arrows 1a—1a;

Figure 2:
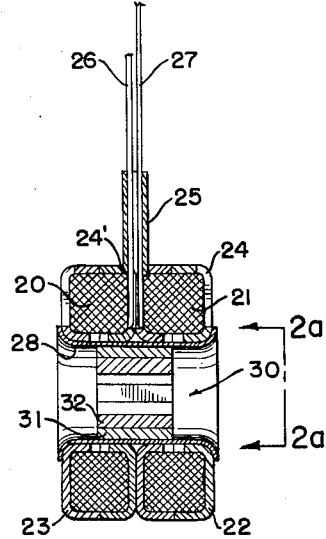
Figure 1A:
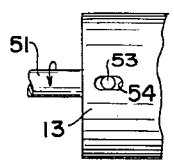
Figure 2A:
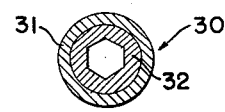
Figure 3:
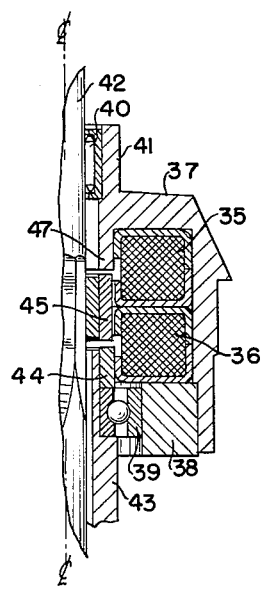

FIGURE 2 illustrates a modified constructional form of the clutch according to the invention, also in longitudinal section, in which two windings are provided instead of one, FIG. 2a is a fragmentary end view of the armature of FIG. 2 looking in the direction of arrows 2a—2a; and FIGURE 3 illustrates a clutch according to the invention which is combined with a housing to form a unit ready for fitting.

Figure 1:
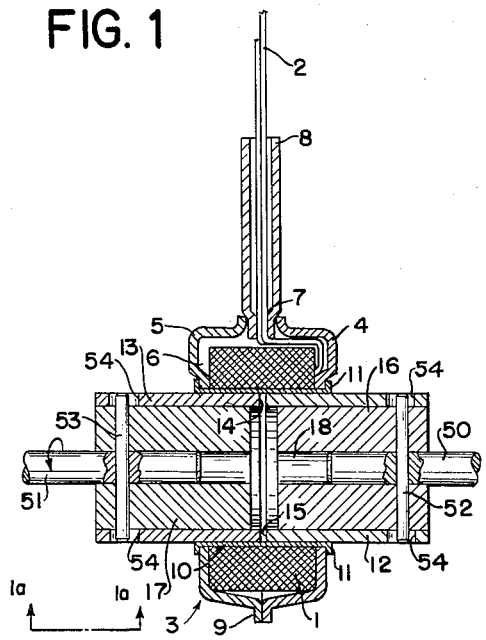
FIGURE 1 illustrates in longitudinal section a miniature clutch according to the invention.

The miniature clutch illustrated in FIGURE 1 comprises a ring-shaped winding 1, which can be connected to an operating supply system through feed conductors 2. The ring-shaped winding is enclosed in a magnetic housing 3, which consists of two like housing halves 4 and 5 disposed symmetrically to one another. As will be seen from the upper half of FIGURE 1, the housing halves are formed with bulges 6 to accommodate the conductors 2. For the same purpose, the edges of the housing halves are formed in the region of the bulges 6 with depressions 7 into which, for example, a conduit 8 consisting of metal, plastic or rubber may be introduced to guide the supply conductors 2. Instead of the depressions 7, there may be formed in the edge of the housing halves mere recesses which, when assembled, form an aperture for the passage of the conductors 2.

The two housing halves 4 and 5 may be connected together in any desired manner after introduction of the coil. For this purpose, the two edges 9 of the housing half may be fashioned in the form of flanges having beaded edges, detents or like securing means. Preferably, however, the two housing halves are held together by a cylindrical sleeve 10 composed of non-magnetic material, which is introduced into the central apertures of the two housing halves and engages by its outwardly flanged end edges, as indicated at 11, over the end faces of the housing halves. The sleeve 10 is thus, in effect, a hollow rivet which firmly clamps the two housing halves together and holds them in their relative positions, so that they form a substantially rigid magnetic housing 3 for the coil 1.

The magnetic housing forms a radial magnetic circuit open on the inside. In order to complete this magnetic circuit on the inside of the coil, there are provided, in the example illustrated, two sleeves 12 and 13 of magnetizable material which are axially movable relative to one another. The proximate end faces of the two sleeves 12, 13 are machined absolutely smooth, so that the two sleeves can be in intimate end-to-end contact with one another at their faces 14 and 15 when brought together. Axial movement of these two sleeves 12, 13 towards one another is produced by the magnetic flux generated by the coil 1, which produces a mutual force of attraction in the two sleeves.

Each of the two sleeves 12, 13 is connected in torque-transmitting fashion, through a core 16, 17 having a central bore 18 to one of two shafts 50 and 51 to be coupled together. For example, shafts 50 and 51, to be coupled together by the clutch, extend into the bore 18 and are connected to the cores 16 and 17 by a pair of dowel pins 52 and 53. The ends of each dowel pin extend into and engage an elliptical aperture 54 in the sleeves 12 and 13 to permit axial movement of the sleeves with respect to the cores 16 and 17. It is in fact only necessary for one of the two sleeves 12 or 13 to be axially displaceable with respect to the fixed magnetic housing, but both parts are preferably axially displaceable in order thus to isolate from the shaft the mechanical coupling forces acting in an axial direction.

The co-acting end faces 14 and 15 of the sleeves 12 and 13 may be hardened in order to lessen the wear on these faces. The cores 16 and 17 may consist of metal, preferably a non-magnetic metal, or of a suitably strong plastic material.

The two sleeves 12 and 13 may be mounted on the shaft to which they are connected in torque-transmitting fashion, but it is also possible for the sleeves to be directly guided in the sleeve 10 by means of appropriate bearing parts (bearing surfaces applied by metallization). In most cases, however, guiding of the sleeves by means of the shafts will be preferred owing to the very high speeds of rotation.

FIGURE 2 illustrates a modified constructional form of the clutch according to the invention, in which two ring coils 20 and 21 are provided which are disposed axially adjacent one another and are enclosed respectively by magnetic housings 22, 23. Each of the magnetic housings 22 and 23 consists of two like housing shells assembled in symmetrical fashion, which in the present example also enclose the coil on the inside with the exception of a gap. Corresponding recesses 24' at one point of the inner housing shells serve to lead out the supply conductors 26 and 27 extending through a conduit 25. The recesses 24 in each of the outer shells are not used and are identical to the recesses 24' of the inner shells and may be filled with a plastic compound if desired.

As is shown in FIGURE 2, all four housing shells are clamped together by a common central sleeve or hollow rivet 28 which is flanged over at its ends around the end face of the outer halves of the housing.

In the constructional example illustrated in FIGURE 2, the two coils 20 and 21 can be selectively energized independently of one another, so that in one case a magnetic flux is set up in the magnetic housing 23 and in the other case in the magnetic housing 22. These magnetic fluxes act upon an armature 30 associated in common with the two magnetic systems. The armature 30 includes an outer sleeve 31 of magnetic material and an inner core 32 of non-magnetic material which may be connected in torque transmitting relation to a shaft (not shown) through the hexagonal inner aperture of the core 32. The miniature clutch illustrated in FIGURE 2 may with advantage be arranged, as hereinafter explained in connection with FIG. 3, in a housing surrounding the entire clutch and may combine with the said housing to form a prefabricated unit ready for fitting. The operation of the clutch illustrated in FIG. 2 is explained in detail in connection with FIG. 3.

Since the torques to be transmitted with miniature clutches range from about 0.1 to 10 kg.-cm., the magnetic fluxes necessary for generating this coupling force are relatively small. It is therefore sufficient for the magnetic housings to consist of a relatively thin-walled material. This fact, in combination with the fact that the magnetic housings consist of two like halves, affords the advantage that these housing halves can be very simply and cheaply produced from sheet metal by deep-drawings, pressing or like forming methods. The further advantage is thereby obtained that the housing halves can carry the magnetic flux in a circle around the coil substantially without losses, since the forming may be carried out in such a manner that the crystal orientation of the housing material corresponds to the magnetic preferred direction at substantially all points of the magnetic housing. As compared with known magnets, this miniature clutch thus has, in addition to its very simple construction, the advantage of very good utilization of the electromagnetic field generated by the winding.

FIGURE 3 illustrates a miniature clutch, similar to that illustrated in FIGURE 2, in a housing which, together with the said clutch, forms a component unit ready for fitting. The two magnetic systems 35 and 36, which again lie in axial juxtaposition and are built up in the same way as the magnetic systems of the clutch according to FIGURE 2, are enclosed in a housing 37 which is composed of a magnetizable material. For this purpose, the housing 37 is made cup or pot-shaped. The pot-shaped housing 37 is sealed at its open end by means of an annular member 38 which serves at the same time to secure the clutch in position in the housing and to clamp together the housing halves forming the magnetic housings. A hollow rivet, such as those, 10 and 28, employed for this purpose in the clutches according to FIGURES 1 and 2 is unnecessary in the arrangement according to FIGURE 3.

The housing 37 is advantageously so constructed as to serve at the same time to support bearings 39, 40 for the shafts to be coupled together. For this purpose, the housing 37 in the example illustrated is provided at one end with a boss 41 in which a needle bearing 40 is supported. The said needle bearing serves for the mounting of a driven shaft 42. In addition, the ring 38 serves to support a ball or roller bearing 39, within which a hollow shaft 43 concentrically surrounding the shaft 42 is mounted. On the end of the hollow shaft 43 is mounted a sleeve 44 arranged to co-act with the armature 45 for the purpose of coupling the hollow shaft 43 to the shaft 42 as soon as the armature connected in torque-transmitting fashion to the shaft 42 is pressed against the sleeve 44 by energization of the coil 36.

The second coil 35 in the present example serves to brake the shaft 42. For this purpose, the housing 37 has a cylindrical, concentric extension 47 which projects into the interior of the magnetic housing enclosing the coil 35. The end face of the extension 47 may co-act with the other end face of the armature 45 as soon as the armature is moved in the direction of the said extension 47 on energization of the coil 35. In operation, the core of the armature 45 is rotationally restrained on the center shaft but is free to move axially thereon under the control of the energization of coil 35 or 36. When coil 36 is energized the lower face of armature 45 contacts the end face of the sleeve 44 carried by the tubular shaft 43 to effectively couple shaft 42 to the shaft 43. Upon energization of coil 35 the armature 45 slides upwardly along the shaft 42 so that the upper face of the sleeve 45 contacts the end face of the extension 47 to provide braking of shaft 42. It will be readily apparent that, instead of the extension 47, a second hollow shaft may extend into the magnetic housing of the coil 35 in order to effect a reversal of the direction of rotation of the shaft 42 by way of the armature 45.

By virtue of the fact that the housing 37 serves both to receive the clutch and to support the bearings for the parts to be coupled together, the coacting parts can be very simply and very accurately positioned and maintained in relation to one another. Thus, it is possible by means of this arrangement to guide the armature 45 in the magnetic system with only a very small radial clearance by means of the mounting of the shaft 42, so that substantially no wear occurs despite the very high speeds of rotation.

The miniature clutch constructed as illustrated in FIGURE 3 and combined with a housing to form a component unit may be employed with advantage, for example for driving the bobbins of textile machines, such as for example spinning machines.

Miniature clutches according to the invention have proved very reliable and useful in practical operation, both in regard to the forces to be transmitted and the freedom from breakdown during lengthy sustained operation, and in regard to the operating times, which may be of the order of magnitude of 10 milliseconds.

While specific embodiments of the invention have been shown and described in detail to illustrate the application of the invention principles, it will be understood that the invention may be embodied otherwise without departing from such principles.

What is claimed is:
1. In an electromagnetically actuated miniature clutch, a stationary magnetic housing, an annular electric coil for generating electromagnetic flux in said housing, which coil is supported by said housing, and at least one magnetizable armature being centrally guided in said housing for axial displacement relative thereto, said armature being adapted to be coupled to a rotatable shaft for rotation therewith, the armature further being arranged to cooperate by means of at least one of its end faces with the end face of at least one coupling member aligned therewith to transmit the torque from a shaft connected to the coupling member to the shaft connected to said armature, said magnetic housing including two identically formed annular housing shells enclosing said coil and being arranged symmetrically with respect to the central radial plane of said coil, each of said shells being formed of drawn sheet metal, and said shells being held together by a central thin-walled sleeve of non-magnetizable material which is flanged over at its end edges on the outside of said shells.

2. A miniature clutch according to claim 1, in which said coupling member includes a sleeve of magnetizable materials centrally guided inside of said magnetic housing so as to act as a second armature.

3. A miniature clutch according to claim 1, in which said armature includes an outer sleeve of magnetizable material connected for the transmission of torque through to a core member of non-magnetizable material to the shaft, at least one of the annular end faces of said sleeve serving as a coupling face.

4. A miniature clutch according to claim 3 wherein said sleeve coupling faces are hardened.

5. An electromagnetically actuated miniature clutch comprising a stationary magnetic housing, an annular electric coil for generating electromagnetic flux in said housing, which coil is supported by said housing, and a pair of magnetizable armatures being centrally guided in said housing each for axial displacement relative thereto, each of said armatures being adapted to be coupled to an associated rotatable shaft for rotation therewith, one of said armatures being arranged to cooperate by means of at least one of its end faces with the end face of the other armature aligned therewith to transmit the torque placed on one armature to the adjacent armature, said magnetic housing including two identically formed annular housing shells of magnetizable material arranged in outer peripheral contacting relationship for enclosing said coil therein and forming a C-shaped cross-section flux return path thereabout, said housing shells being arranged symmetrically with respect to the central radial plane of said coil, each of said shells being formed of drawn sheet metal and said shells being held together by a central thin-walled sleeve of non-magnetizable material which is flanged over at its end edges on the outside of said shells.

References Cited in the file of this patent
UNITED STATES PATENTS

| | | |
|---|---|---|
| 1,303,484 | Langdon-Davies | May 13, 1919 |
| 1,622,261 | Payne | Mar. 22, 1927 |
| 2,490,044 | Garbarini et al. | Dec. 6, 1949 |
| 2,757,768 | Landerer | Aug. 7, 1956 |
| 2,801,720 | Bachman | Aug. 6, 1957 |
| 2,859,845 | Bachman | Nov. 11, 1958 |
| 2,919,776 | Pierce | Jan. 5, 1960 |
| 3,016,118 | Zatsky | Dec. 29, 1962 |

FOREIGN PATENTS

| | | |
|---|---|---|
| 119,972 | Germany | Apr. 30, 1901 |